United States Patent [19]

Nagata

[11] Patent Number: 5,390,344
[45] Date of Patent: Feb. 14, 1995

[54] FM AUDIO SIGNAL RECEIVER HAVING A CHARACTERISTIC CONTROL FUNCTION

[75] Inventor: Yuichi Nagata, Hamamatsu, Japan

[73] Assignee: Yamaha Corporation, Hamamatsu, Japan

[21] Appl. No.: 986,899

[22] Filed: Dec. 8, 1992

Related U.S. Application Data

[63] Continuation of Ser. No. 584,462, Sep. 18, 1990, abandoned.

[30] Foreign Application Priority Data

Sep. 21, 1989 [JP] Japan .................. 1-245708

[51] Int. Cl.6 ............................................. H04B 1/10
[52] U.S. Cl. ................................. 455/220; 455/222; 455/296; 381/10
[58] Field of Search .................. 455/186.1, 220, 222, 455/234.2, 296, 297, 226.1, 226.2; 381/7, 10

[56] References Cited

U.S. PATENT DOCUMENTS

| 4,564,862 | 1/1986 | Cohen | 455/296 |
| 4,723,288 | 2/1988 | Borth et al. | 381/7 |
| 4,910,752 | 3/1990 | Yester, Jr. et al. | 455/343 |
| 4,947,454 | 8/1990 | Garner | 455/186.1 |
| 5,036,543 | 7/1991 | Ueno | 455/222 |
| 5,063,597 | 11/1991 | Seo et al. | 455/222 |

Primary Examiner—Edward F. Urban
Attorney, Agent, or Firm—Spensley Horn Jubas & Lubitz

[57] ABSTRACT

An FM audio signal receiver having a characteristic control function includes a receiving circuit for receiving an FM broadcast wave, a received state analyzing circuit for analyzing a state of the FM broadcast signal received by the receiving circuit, an analog-to-digital converter for analog-to-digital converting the FM broadcast signal received by the receiving circuit, a digital signal processor for performing processing for improving characteristics of the digital-to-analog converted signal, a parameter table memory for storing parameters for the digital signal processor and a control circuit for reading out a proper parameter for realizing improvement of a characteristic of the digital-to-analog converted signal from the parameter table memory in response to result of analysis by the received state analyzing circuit and controlling the digital signal processor with the read out parameter. The receiver is capable of improving characteristics of a received signal by processing the received signal with a preset parameter which is read out in accordance with the state of the received signal.

21 Claims, 6 Drawing Sheets

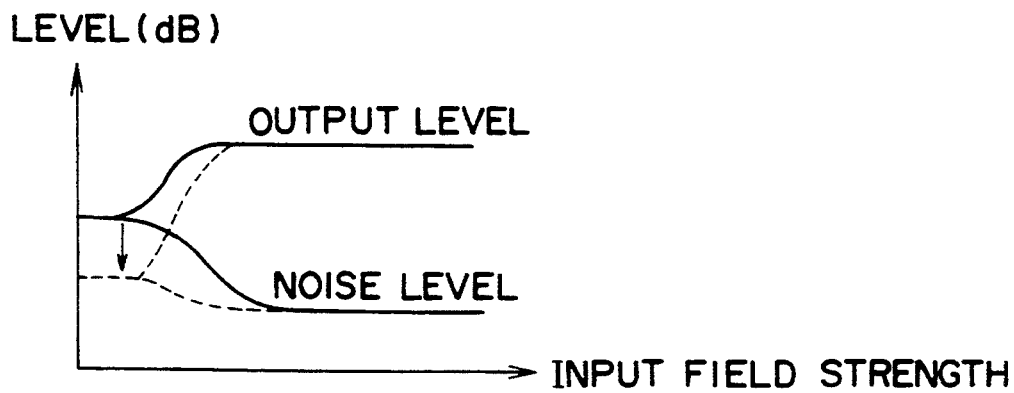
F I G. 2
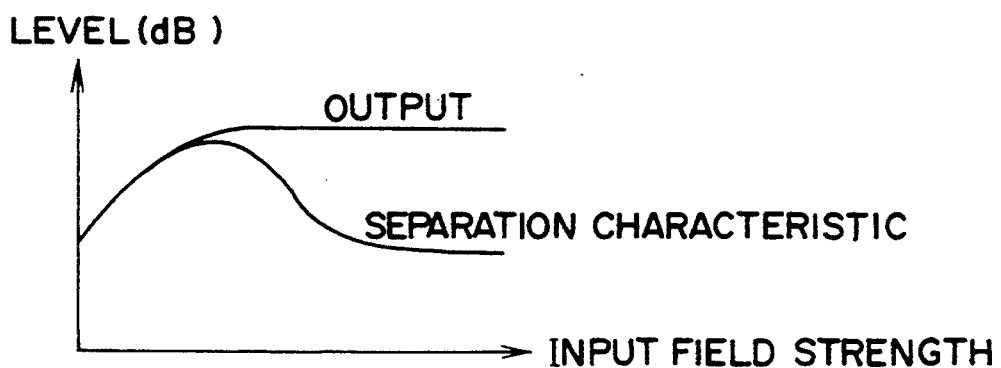
F I G. 3
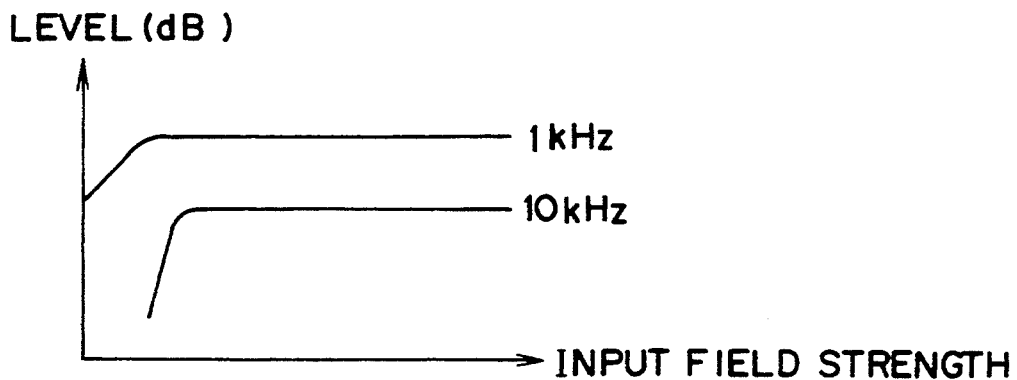
F I G. 4

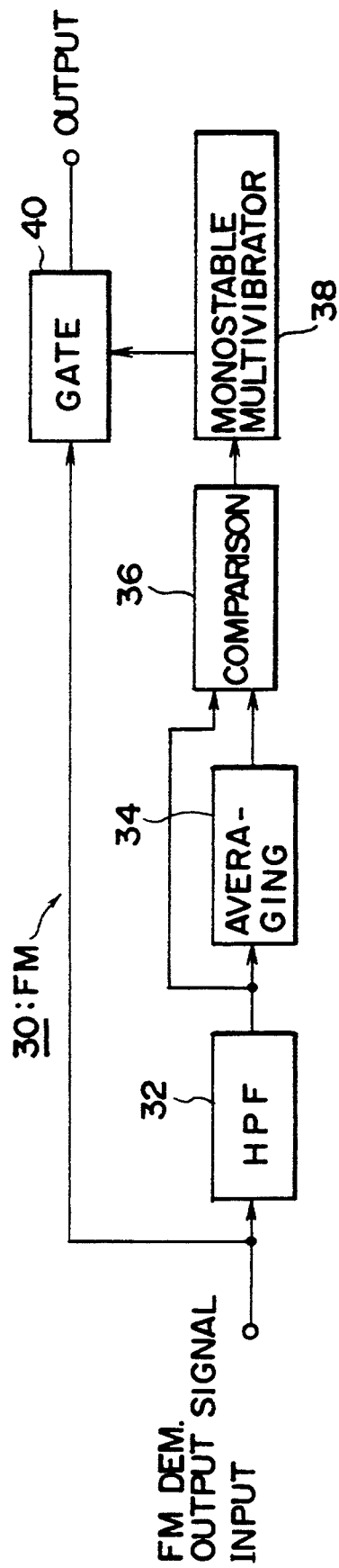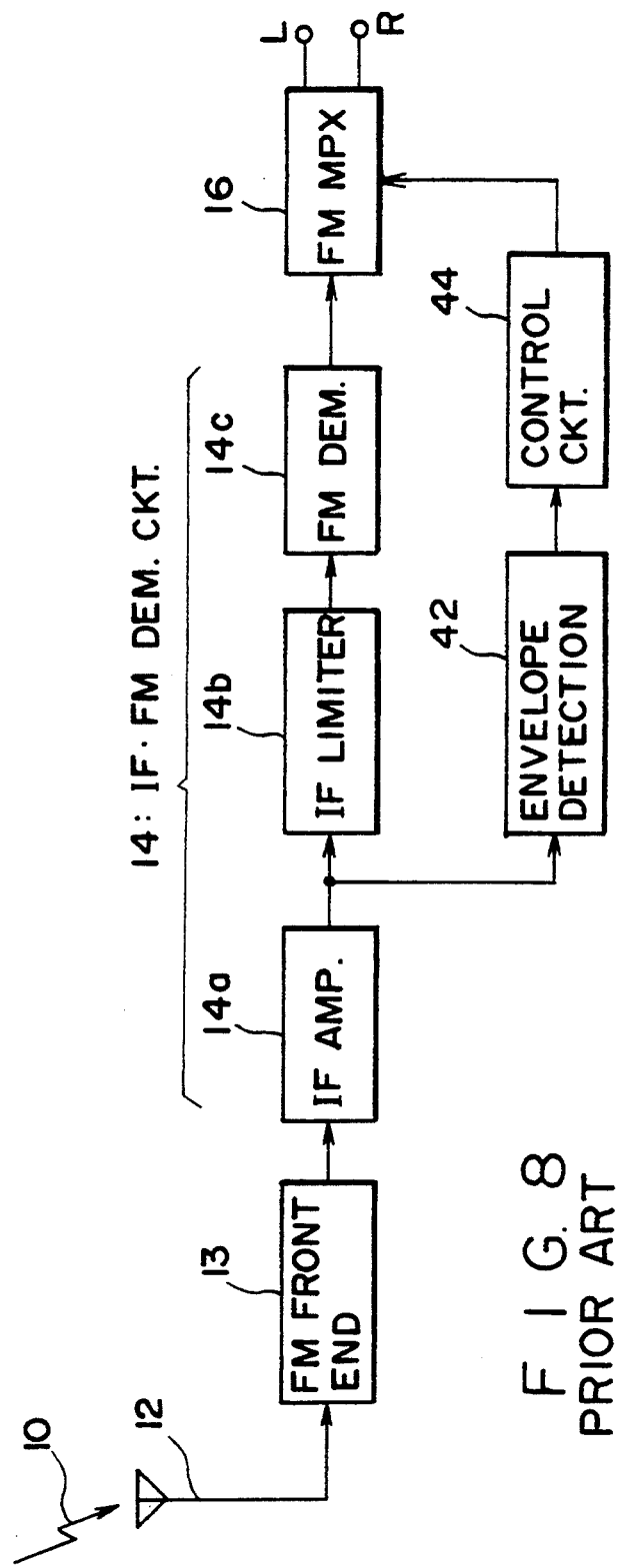
FIG. 7 PRIOR ART
FIG. 8 PRIOR ART

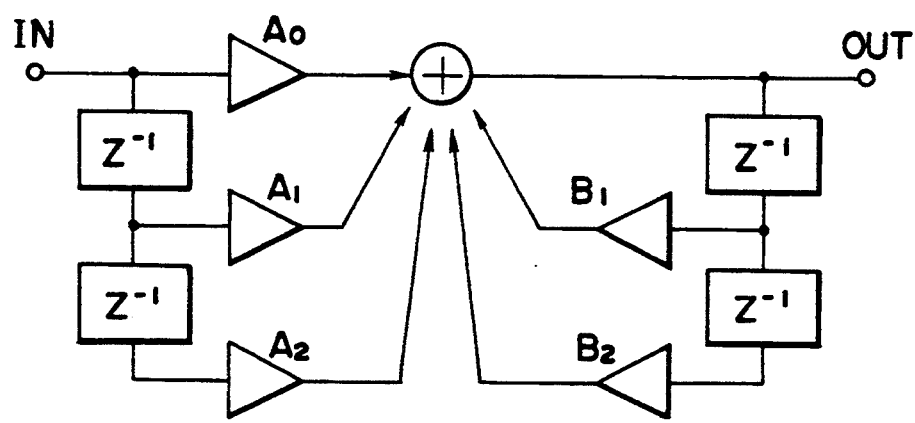
$$H(Z) = \frac{A_0 + A_1 Z^{-1} + A_2 Z^{-2}}{1 - B_1 Z^{-1} - B_2 Z^{-2}}$$
F I G. 11

FM AUDIO SIGNAL RECEIVER HAVING A CHARACTERISTIC CONTROL FUNCTION

This is a file wrapper continuation of Ser. No. 07/584,462, filed on Sep. 18, 1990, now abandoned.

BACKGROUND OF THE INVENTION

This invention relates to an FM audio signal receiver (tuner) for FM audio signals such as FM broadcast and television broadcast signals and, more particularly, to an FM audio signal receiver capable of improving characteristics of input FM audio signals in accordance with a state of the input FM signals.

In receiving broadcast wave such as FM broadcast wave and FM audio signals of television broadcast wave, conventional stereophonic audio receivers mounted on automobiles control the level, separation characteristic and frequency characteristic of input FM audio signals in accordance with field strength of these signals to change characteristics of the signals over the range from a weak field strength to a strong field strength and thereby obtain a tone which is more pleasant for listening.

As to the level, for example, a noise level tends to increase when an input signal is of a weak field strength. For preventing this phenomenon, a control called SMC (soft mute control) is performed in such a manner that, as shown in FIG. 2, the output level is decreased to decrease the noise level when the input signal is of a weak field strength so that an unpleasant noise can be reduced.

As to separation characteristic, noise tends to increase if the degree of separation is high when an input stereophonic signal is of a weak field strength. For preventing this phenomenon, a control called SNC (stereophonic noise control) is performed in such a manner that, as shown in FIG. 3, the degree of separation is decreased when the input stereophonic signal is of a weak field strength.

As to frequency characteristic, a noise in the high frequency region tends to become particularly unpleasant when an input signal is of a weak field strength. For preventing this phenomenon, a control called HCC (high cut control) is performed in such a manner that, as shown in FIG. 4, the high frequency region is attenuated when the input signal is of a weak field strength.

FIG. 5 shows a conventional receiver having functions of the above described controls of SMC, SNC and HCC. In the receiver of FIG. 5, an FM broadcast signal received by an antenna 10 is supplied to an intermediate frequency amplification and FM demodulation circuit 14 through an FM front end section 13 and a signal of a desired broadcasting station is demodulated. The demodulated signal is separated to left and right channel signals by an FM multiplex circuit 16 and delivered out for propagation.

In the receiver of FIG. 5, the respective controls of SMC, SNC and HCC are performed by supplying field strength outputs derived from a signal meter output of the FM demodulation circuit 14 to respective control terminals through semifixed resistors 24, 26 and 28.

For eliminating pulse noise such as an engine noise which occurs during receiving of an FM broadcast signal in a conventional stereophonic receiver mounted on an automobile, an FM noise cancellet 30 (e.g., chip No. LA 2110) is provided between the intermediate frequency amplification and FM demodulation circuit 14 and the FM multiplex circuit 16 as shown in FIG. 6. In this noise cancellet 30, as shown in FIG. 7, an FM demodulator output signal is applied to a high-pass filter 32 to extract a noise component in its high frequency component (over about 100 kHz). The extracted noise component is flattened by an averaging circuit 34 and the flattened noise component is compared with the unprocessed noise component by a comparator 36 to detect a pulse noise. A monostable multivibrator 38 is triggered at rising of the pulse noise to drive a gate circuit 40 whereby noise in the FM demodulator output signal is eliminated.

In a case where an FM broadcast signal is received by receiver mounted on an running automobile, a multi-path noise is generated due to receiving both a direct wave from a broadcasting antenna and a reflected wave produced due to geographical and architectural situations in which the running automobile is located (i.e., multipath reflection interference). This noise deteriorates the quality of a reproduced tone so that it is very unpleasant to the listener. An FM broadcast signal is normally constant in its amplitude but its amplitude and phase are subjected to variation due to the interference when a reflected wave is added to a direct wave. This situation differs depending upon the ratio, delay time and phase difference between the direct wave and reflected wave. For preventing this multipath noise, in a conventional receiver, an output signal from an IF amplifier 14a before being applied to an IF limiter 14b is applied to an envelope detection circuit 42 as shown in FIG. 8 for detection of an envelope of the signal and therefore variation in the amplitude (in some cases, delay time and phase are also detected together with output frequency deviation of an FM demodulation circuit 14c). In accordance with the detected envelope, a control circuit 44 performs a control in the FM multiplex circuit 16 so that frequency characteristic of a reproduced signal is modified (mainly attenuation of the high frequency region) and separation characteristic is changed and, sometimes, the operation mode is changed from a stereophonic operation to a monaural (monophonic) operation. Since the receiving situation momently changes in the running automobile, timing of the control (i.e., rising time and duration of a control operation) is very important.

Since the receiver shown in FIG. 5 is constructed of an analog integrated circuit and discrete parts and the field strength outputs are applied to the respective control terminals through the semi-fixed resistors 24, 26 and 28 to perform the controls of SMC, SNC and HCC in analog manner, dispersion tends to occur in control characteristics to such a degree that it sometimes becomes necessary to make adjustments. Besides, respective control characteristics interfere with one another (i.e., adjustment of one parameter brings about change in another parameter) so that it is difficult to obtain a desirable setting state.

There are wide ranges of pulse amplitude and pulse width in a pulse noise such as an engine noise applied to the receiver. According to the noise canceller 30 shown in FIG. 7, however, noise having a pulse width which is determined by the monostable multivibrator 38 only can be removed and the noise canceller 30 is ineffective for a pulse noise having a larger pulse width than that. Besides, if input field strength is weak, a large amount of noise component is contained in the FM signal so that the high frequency component for detecting a pulse noise is instable with resulting deterioration in the accuracy of detection or, conversely, with a result that a pulse noise is erroneously detected due to an FM weak field strength noise leading to an erroneous control operation. For these reasons, setting for the control operation is extremely difficult.

It is also difficult for the construction shown in FIG. 8 to eliminate a multipath noise in all situations even if the contents of control are set in accordance with one situation in which a multipath noise occurs, because the situation in which the multipath noise occurs is very complicated. It is therefore difficult to perform a fine control depending upon the situation in which a multipath noise occurs. It is also difficult to match a rising time and duration of operation of the control circuit 44 in accordance with the situation of the multipath noise.

It is, therefore, an object of the invention to provide a receiver which is capable of improving characteristics of input FM audio signals in accordance with the state of the input FM signals.

SUMMARY OF THE INVENTION

An FM audio signal receiver achieving the above described object of the invention comprises receiving means for receiving an FM broadcast wave, received state analyzing means for analyzing a state of an FM broadcast signal received by the receiving means, analog-to-digital conversion means for analog-to-digital converting the FM broadcast signal received by the receiving means, digital signal processing means for performing processing for changing a characteristic of the analog-to-digital converted signal, parameter table memory means for storing parameters for the digital signal processing means, and control means for reading out a proper parameter for realizing improvement of a characteristic of the analog-to-digital converted signal from the parameter table memory means in response to result of analysis by the received state analyzing means and controlling the digital signal processing means with the read out parameter.

According to the invention, an FM broadcast wave signal received by the receiving means is converted to a digital signal by the analog-to-digital conversion means and thereafter is applied to the digital signal processing means. On the other hand, the state of the received broadcast wave is analyzed by the received state analyzing means and a parameter is read from the parameter memory means by the control means in response to result of analysis by the received state analyzing means and a parameter value in the digital signal processing means is thereby determined. A characteristic improvement processing is performed by the control means with respect to the broadcast wave signal which has been converted to a digital signal in accordance with this parameter value.

According to the invention, characteristics required for improving characteristics of a received signal are preset in the parameter table memory means and the digital signal processing means processes the received signal digitally in accordance with the state of the received signal for improving its characteristics. Dispersion in characteristics can thereby be eliminated. Besides, since each characteristic of the received signal can be improved independently in accordance with the state of the received FM broadcast signal, occurrence of interference between respective characteristics as has occurred in the conventional receiver is prevented so that a desired setting can be realized in accordance with a state of a received signal without necessity for compromising in circuit design and also without necessity for peforming adjustment. Further, accuracy in analysis of the received state analyzing means can be improved and, in accordance therewith, a fine control for improving characteristic can be realized by increasing the number of parameters stored in the parameter table memory means.

Specific manners of improving characteristics of a received signal are as follows:

(1) The received state analyzing means detects input field strength and the digital signal processing means performs, in response to a detected value of the input field strength, a characteristic improvement processing with respect to one or more of output level, separation characteristic and frequency characteristic.

(2) The received state analyzing means detects input field strength and noise and the digital signal processing means performs, in response to detected values thereof, a noise elimination processing.

(3) The received state analyzing means detects variation in a received signal output amplitude and the digital signal processing means performs, in response to a detected value thereof, a multipath noise elimination processing.

(4) The received state analyzing means detects variation in a received signal output amplitude and input field strength and/or frequency deviation and the digital signal processing means performs, in response to detected values thereof, a multipath noise elimination processing.

BRIEF DESCRIPTION OF THE DRAWINGS

In the accompanying drawings,

FIG. 2 is a diagram showing an example of SMC characteristic;

FIG. 3 is a diagram showing an example of SNC characteristic;

FIG. 4 is a diagram showing an example of HCC characteristic;

FIG. 7 is a block diagram showing a specific example of a prior art FM noise canceller 30 in FIG. 6;

FIG. 8 is a block diagram showing a prior art FM receiver having a structure for eliminating a multipath noise;

FIG. 11 is a diagram showing an example of a digital filter function performed by a digital signal processor 70 of FIG. 1.

DESCRIPTION OF A PREFERRED EMBODIMENT

Figure 1:
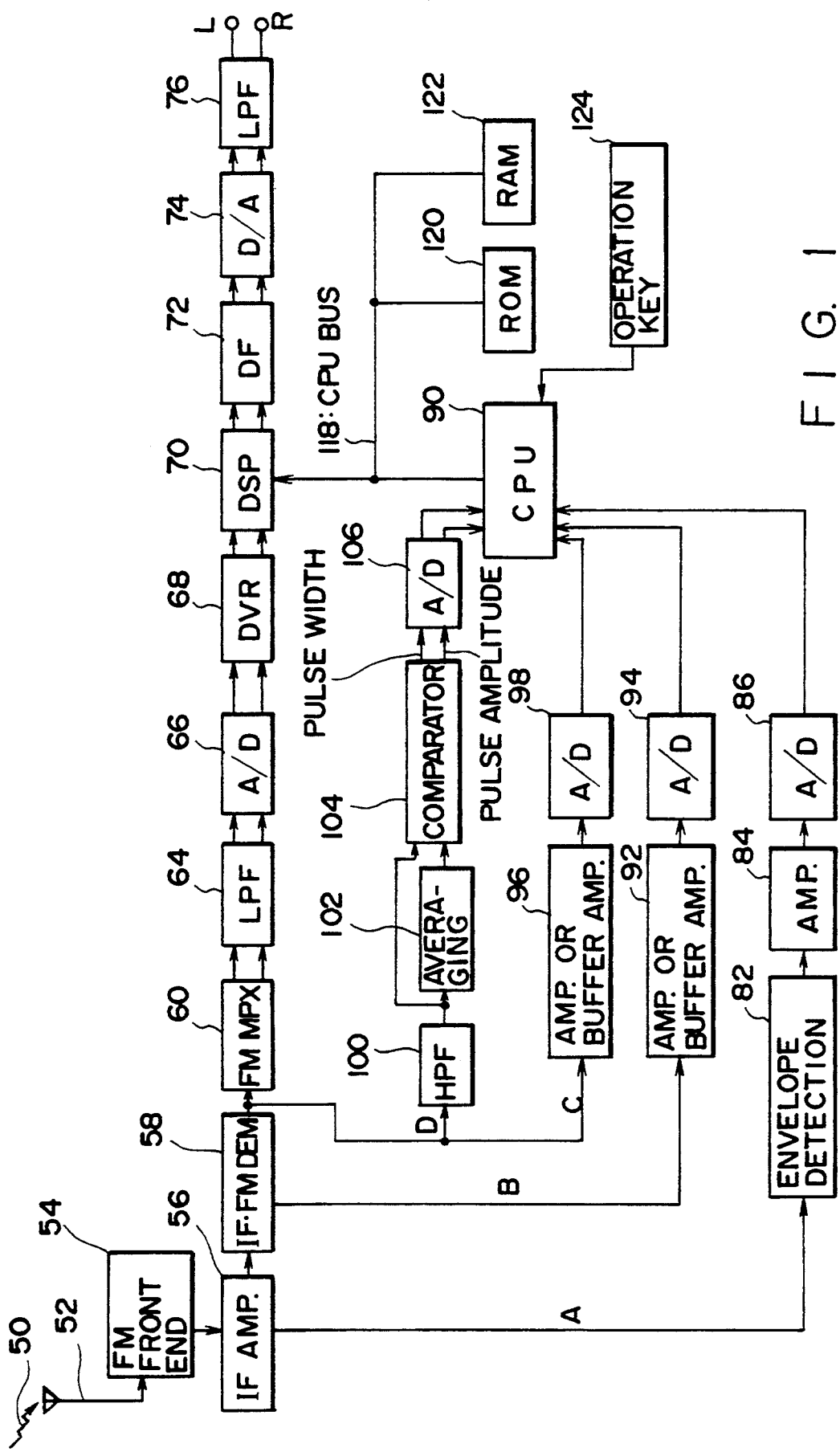
FIG. 1 is a block diagram showing a preferred embodiment of the invention.
Figure 5:
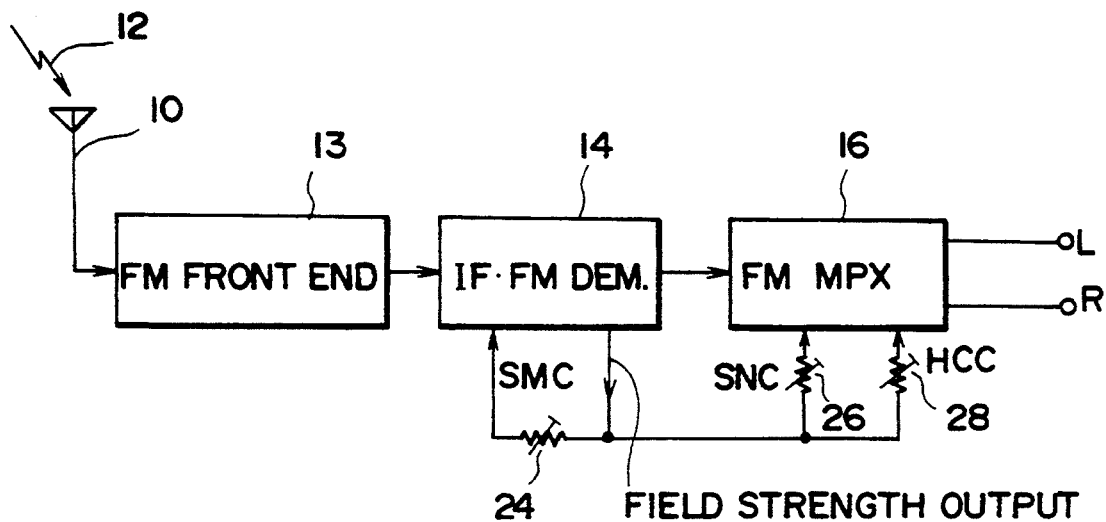
FIG. 5 is a block diagram showing a prior art FM tuner having a structure for performing SMC, SNC and HCC controls.
Figure 6:
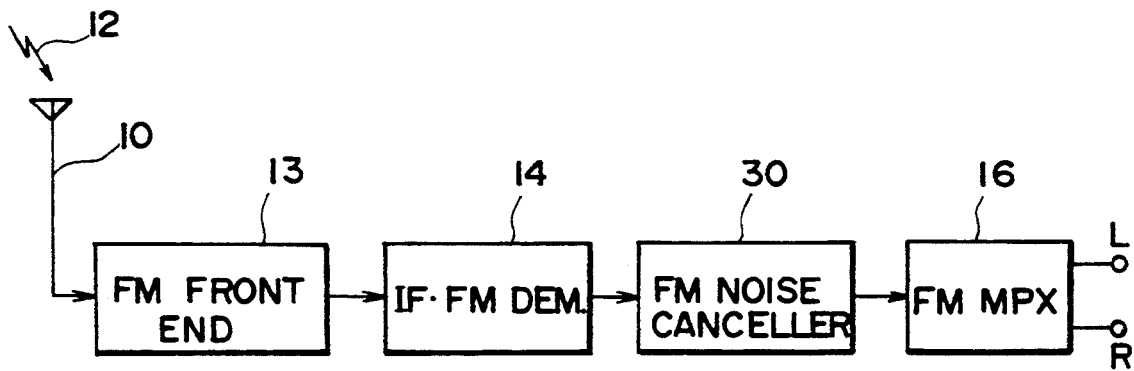
FIG. 6 is a block diagram showing a prior art FM tuner having a structure for eliminating noise.

An embodiment receiver of the FM audio signal of the present invention applied to an FM tuner is shown in FIG. 1. An FM broadcast wave 50 is received by an antenna 52 and an FM signal is of a desired station selected through an FM front end section 54 and an IF (intermediate frequency) amplification section 56. The output of the IF amplification section 56 is FM-demodulated by an IF. FM demodulation section 58 and is separated into left and right channel signals by an FM multiplex circuit 60. The output of the FM multiplex circuit 60 is applied to a low-pass filter 64 for preventing the aliasing noise.

The output of the low-pass filter 64 is converted to a digital signal by an analog-to-digital converter 66. This digital signal is adjusted in its level by a digital volume (variable resistor) 68 and supplied to a digital signal processor (DSP) 70 for being subjected to various processing for improvement of characteristics of the received FM signal. The output of the digital signal processor 70 is supplied to a digital-to-analog converter 74 through an oversampling digital filter 72 and the output analog signal of the digital-to-analog converter 74 is delivered out for propagation through a low-pass filter 76. It is also possible to take out the output of the digital filter 72 as a direct digital output signal without converting it to an analog signal by the digital-to-analog converter 74.

An envelope detection circuit 82 detects an envelope of the signal of a selected station in a stage prior to an IF limiter in the IF amplification section 56 and thereby detects variation in the amplitude of the signal. The detection output is applied through an amplifier 84 to an analog-to-digital converter 86 for conversion to an analog signal. The output analog signal is supplied to a CPU (central processing unit) 90.

A signal derived from a signal meter output of the IF. FM demodulation circuit 58 having a voltage proportionate to input field strength of a selected station is supplied through an amplifer or buffer amplifier 92 to, an analog-to-digital converter 94 for conversion to a digital signal. The output digital signal is supplied to the CPU 90.

The demodulated output of the FM demodulation circuit 58 is supplied through an amplifer or buffer amplifier 96 to an analog-to-digital converter 98 for conversion to a digital signal. The output digital signal is supplied to the CPU 90.

The demodulated output of the FM demodulation circuit 58 is supplied to a high-pass filter 100 where a component of over 100 kHz is extracted. The extracted component is flattened by an averaging circuit 102 and compared with the signal before flattening by a comparator 104 whereby the pulse width and pulse amplitude of a noise component over 100 kHz is detected. These detected values are applied to the CPU 90 through an analog-to-digital converter 106.

To the CPU 90 are connected a ROM 120 and a RAM 122 through a CPU bus 118. In the ROM 120 are prestored various parameters corresponding to respective states of the received signal for improvement characteristics of the received signal in the DSP 70. These parameters are read out in response to a command from the CPU in accordance with information of a particular state of the received state and set in the DSP 70. The DSP 70 thereupon processes the input received signal with the selected parameter and thereby improves its characteristics. The RAM 122 performs temporary holding and reading of data from the DSP 70 or ROM 120 in accordance with commands from the CPU 90.

An operation key 124 is provided for selecting a parameter from among the parameters prestored in the ROM 120 by outside manipulation by the player and setting the selected parameter in the DSP 70. Review of characteristics of the received signal can be facilitated by the employment of this operation key 124.

A specific example of the characteristic improvement processing by the device of FIG. 1 will now be described. Table 1 shows relationship between contents of detected states of a received signal and various characteristics which are processed for improvement in accordance with the state of the received signal. With respect to each contents of detected states of a received signal, characteristic which is improved is indicated with a circle. Channels of detection corresponding to the contents of detected states of a received signal designated by reference characters A to D in Table 1 are designated by the same reference characters in FIG. 1.

TABLE 1

| Contents of detected states of a received signal | Improved characteristic | | | | |
|---|---|---|---|---|---|
| | SMC | SNC | HCC | Noise elimination | Multipath elimination |
| A Output of envelope detection circuit 82: detection of variation in amplitude of received signal | — | — | — | — | ⊚ |
| B Signal meter output of FM demodulation circuit 58: detection of input field strength | ⊚ | ⊚ | ⊚ | ⊚ | ⊚ |
| C Demodulated output of FM demodulation circuit 58: detection of frequency deviation | — | — | — | — | ⊚ |
| D Demodulated output of FM demodulation circuit 58: detection of noise over 100 kHz | — | — | — | ⊚ | — |

Description will be made specifically about contents of the characteristic improvement processing shown in Table 1.

(1) SMC (soft mute control)

The, ROM 120 prestores characteristic improvement parameters for SMC corresponding to an input field strength (e.g., a parameter which causes the output level to decrease when the input field strength is weak). One of these parameters is read out in response to a command from the CPU 90 in accordance with a detected input field strength and set in the DSP 70. The DSP 70 performs digital multiplication processing by using this parameter for realizing a level control.

(2) SNC (stereophonic noise control)

The ROM 120 prestores a characteristic improvement parameters for SNC corresponding to an input field strength (e.g., a parameter for reducing separation when the input field strength is weak). One of these parameters is read out in response to a command from the CPU 90 in accordance with a detected field strength and set in the DSP 70. The DSP 70 performs addition of left and right channel signals by using this parameter for controlling a stereophonic separation characteristic (in the case of a stereophonic broadcasting only).

(3) HCC (high cut control)

The ROM 120 prestores characteristic improvement parameters for HCC corresponding to an input field strength (e.g., a parameter for attenuating a high frequency region when the input field strength is weak). One of these parameters is read out in response to a command from the CPU 90 in accordance with a detected input field strength and set in the DSP 70. The DSP 70 performs a digital filter processing (convolution operation) by using this parameter for controlling frequency characteristic.

(4) Noise elimination

The ROM 120 prestores noise eliminating parameters corresponding to input field strength and pulse width and pulse amplitude of a pulse noise. One of these parameters is read out in response to a command from the CPU 90 in accordance with detected field strength and pulse width and pulse amplitude and set in the DSP 70 for elimination of noise by a convolution operation. As to field strength, for example, when field strength decreases, a noise component increases with a result that an erroneous operation is made by mistaking this noise component for a pulse noise. The parameter is used for reducing this correction effect. For this purpose, parameters for reducing the amount of correction in proportion to field strength are prestored.

According to this arrangement, many noise elimination characteristics are preset in the ROM 120 and one of these characteristics is read out for digital processing. Accordingly, noise elimination can be effected properly without being accompanied by occurrence of dispersion in characteristics. Besides, setting of operation point is easy in this noise elimination technique. Further, a noise elimination characteristic corresponding to input field strength can be obtained.

(5) Multipath noise elimination

Figure 9:
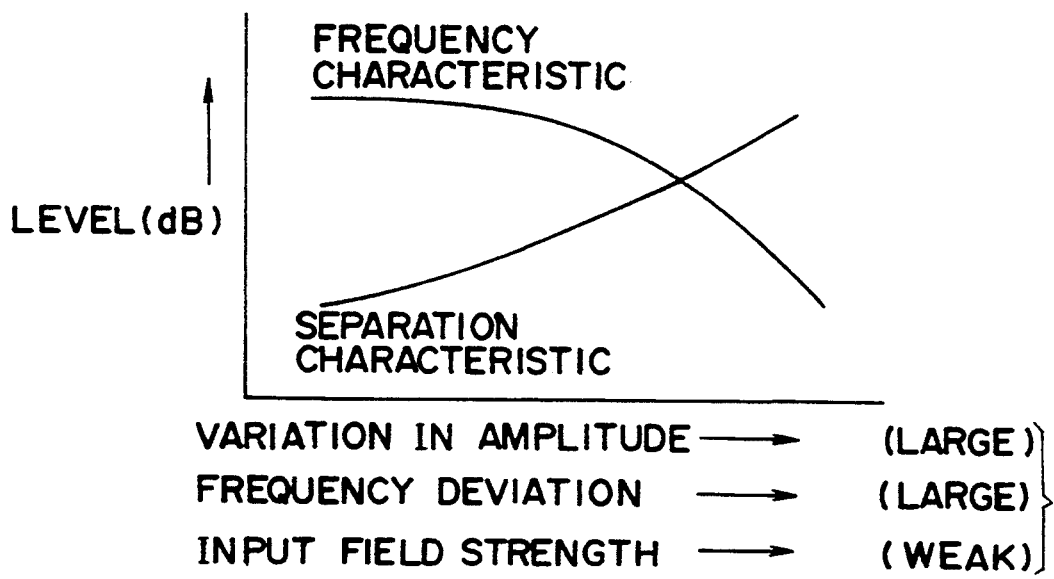
FIG. 9 is a diagram showing an example of improvement in the tone quality against a multipath noise of the FM receiver shown in FIG. 1.

The ROM 120 prestores multipath noise elimination characteristic parameters (frequency characteristic, separation characteristic and control time for these characterisitcs (e.g., rising time, sustaining time and falling time) corresponding to variation in the amplitude of a received signal, input field strength and frequency deviation of the FM signal. One of these parameters is read out in response to a command from the CPU 90 in accordance with detected amplitude variation, input field strength and frequency deviation and set in the DSP 70. The DSP 70 performs a convolution operation by using this parameter for elimination of the multipath noise and resulting improvement in the tone quality. More specifically, as shown in FIG. 9, as variation in the amplitude of the received signal increases and frequency deviation increases and input field strength decreases, a control is made so that separation is decreased (i.e., approaching from stereophonic to monophonic) and frequency characteristic is also decreased (e.g., by increasing the amount of high frequency attenuation).

Figure 10:
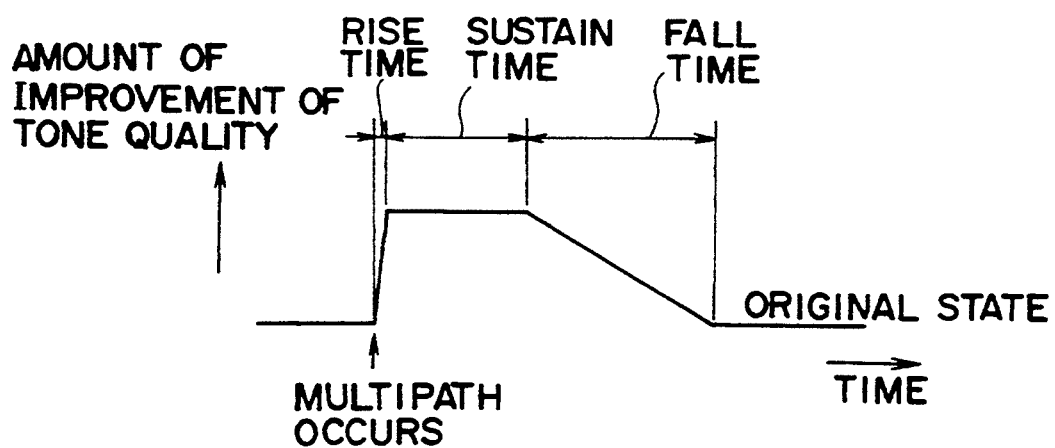
FIG. 10 is a diagram showing an example of lapse of control time in the tone quality improvement control.

Further, control time for performing such tone quality improvement is controlled as shown in FIG. 10.

According to this arrangement, frequency characteristic and separation characteristic can be controlled independently from each other so that a fine multipath elimination control can be achieved in accordance with the state of occurrence of multipath noise. Morevoer, the control time can be caused to match accurately to the state of multipath noise.

The multipath noise elimination can be made in accordance only with variation in the amplitude of the received signal. However, a more accurate multipath noise elimination can be achieved by taking either or both of input field strength and frequency deviation of the FM signal with variation in the amplitude.

The following Table 2 shows an example of parameter values set for the multipath elimination control. The items A, B and C of detection values in this table correspond respectively to the respective contents of detected states A, B and C in Table 1. In the case of performing the multipath elimination control, as will be apparent from Table 1, A: variation in amplitude received signal, B: input field strength and C: frequency deviation of an FM signal, for example, are detected, proper parameters are read from the ROM 120 by the CPU 90 and a digital operation is performed by the DSP 70 in response to these parameters.

TABLE 2

| DETECTION VALUE | | | | | | | | | |
|---|---|---|---|---|---|---|---|---|---|
| A. VARIATION IN AMPLITUDE [%] | 5 or less | 5–20 | | 20–40 | | 40–60 | | 60 or more | |
| B. INPUT FIELD STRENGTH [dB] | 80 or more | 80–60 | | 60–40 | | 40–20 | | 20 or less | |
| C. FREQUENCY DEVIATION [kHz] | ±75 or less | less than ± 37.5 | ±37.5 or more | less than ± 37.5 | ±37.5 or more | less than ± 37.5 | ±37.5 or more | less than ± 37.5 | ±37.5 or more |
| CONTROL AMOUNT | | | | | | | | | |
| FREQUENCY CHARACTERISTIC [10 kHz] [dB] | 0 | 0 | −3 | 0 | −3 | −3 | −6 | −6 | −10 |
| SEPARATION [dB] | 0 | 0 | −3 | −6 | −10 | −6 | −10 | MONO | MONO |
| CONTROL TIME | | | | | | | | | |
| SUSTAINING TIME [sec] | — | — | 3 | 3 | 6 | 3 | 6 | 10 | 10 |
| FALLING TIME [sec] | — | — | 6 | 6 | 12 | 6 | 12 | 20 | 20 |

In the case of Table 2, frequency characteristic and separation are controlled as the control amount while sustaining time and falling time are controlled as the control time. values of frequency characteristic represent attenuation amount at 10 kHz (i.e., a high-cut filter operation is performed). Values of separation represent the amount of level reduced from the level of the received signal (i.e., the larger the reduced level, the nearer to the monophonic mode). In the table, "MONO" represents that the state has been brought to the monophonic mode. The control time is expressed on the basis of the above described FIG. 10. Values of rising time are fixed. In the case of Table 2, if it has been detected that A: variation in amplitude is 5 to 20 (%), B: frequency deviation is 80 to 60 (dB) and C: input field strength is ±37.5 (kHz) or more, the CPU 90 automatically sets the changing level of frequency characteristic at 10 kHz to −3 dB, the changing level of separation to −3 dB, sustaining time to 3 seconds and falling time to 6 seconds respectively. The received signal is subjected to the digital signal processing (convolution operation processing) on the basis of by these parameters and thereafter is provided to a next stage.

These parameters are not limited to the values shown in Table 2 but each divided region of parameters may be set at larger or smaller values. As to the manner of the above described frequency control, other operations such as a band elimination filter operation can be employed instead of the above described high-cut filter operation.

In the device of FIG. 1, the DSP 70, i.e., the digital signal processing circuit, is a well known device and can perform digital multiplication, digital addition and a digital filter operation as shown in FIG. 11 by various programming. The construction of FIG. 11 is a secondary filter construction which realizes a digital operation by setting respective coefficients (A0, A1, A2, B1, B2 and Z) at proper values. The digital filter construction however is not limited to the one shown in FIG. 11 but other known constructions which can perform digital operations may also be employed. The DSP 70 is capable of performing a 2-channel output type surround processing (e.g., subtracting between left and right channel signals and adding a delayed signal to the left and right channel signals) and a 2-channel output type graphic equalizer processing (e.g., providing, for each of left and right channels, a circuit having digital filters for providing frequency bands determined by dividing the entire frequency band into plural bands connected in cascade-connection connection and passing left and right channel signals through these circuits).

What is claimed is:

1. An FM audio signal receiver comprising:
   receiving means for receiving an FM broadcast signal;
   received state analyzing means for analyzing a state of an FM broadcast signal received by the receiving means, said received state analyzing means detecting variation in output amplitude and input field strength of the received FM broadcast signal;
   analog-to-digital conversion means for analog-to-digital converting the FM broadcast signal received by the receiving means;
   digital signal processing means for changing a characteristic of the analog-to-digital converted signal;
   parameter table memory means for storing parameters for the digital signal processing means; and
   control means for reading out from the parameter table memory means a proper parameter for realizing improvement of a characteristic of the analog-to-digital converted signal in response to a result of analysis by the received state analyzing means and for controlling the digital signal processing means with the read out proper parameter,
   wherein said digital signal processing means performs, in response to detected values of the variation in the output amplitude and the input field strength of the received FM broadcast signal, multipath noise elimination processing for processing a multipath noise.

2. An FM audio signal receiver as defined in claim 1, wherein said parameter table memory means stores parameters for decreasing the output level of the received FM broadcast signal when the input field strength thereof is weak.

3. An FM audio signal receiver as defined in claim 2, wherein said digital signal processing means performs digital multiplication of the analog-to-digital converted signal in response to the read out proper parameter.

4. An FM audio signal receiver as defined in claim 1, wherein said parameter table memory means stores parameters for decreasing separation characteristic of the received FM broadcast signal when the input field strength thereof is weak.

5. An FM audio signal receiver as defined in claim 4, wherein said digital signal processing means performs digital addition of the analog-to-digital converted signal in response to the read out proper parameter.

6. An FM audio signal receiver as defined in claim 1, wherein said parameter table memory means stores parameters for attenuating a high frequency region of the received FM broadcast signal when the input field strength thereof is weak.

7. An FM audio signal receiver as defined in claim 6, wherein said digital signal processing means performs digital filtering of the analog-to-digital converted signal in response to the read out proper parameter.

8. An FM audio signal receiver as defined in claim 1, wherein said digital signal processing means performs a convolution operation in response to the read out proper parameter.

9. An FM audio signal receiver comprising:
   receiving means for receiving an FM broadcast signal;
   received state analyzing means for analyzing a state of an FM broadcast signal received by the receiving means, said received state analyzing means detecting variation in output amplitude and frequency deviation of the received FM broadcast signal;
   analog-to-digital conversion means for analog-to-digital converting the FM broadcast signal received by the receiving means;
   digital signal processing means for changing a characteristic of the analog-to-digital converted signal;
   parameter table memory means for storing parameters for the digital signal processing means; and
   control means for reading out from the parameter table memory means a proper parameter for realizing improvement of a characteristic of the analog-to-digital converted signal in response to a result of analysis by the received state analyzing means and for controlling the digital signal processing means with the read out proper parameter,
   wherein said digital signal processing means performs, in response to detected values of the variation in the output amplitude and frequency deviation of the received FM broadcast signal, multipath noise elimination processing for eliminating a multipath noise.

10. An FM audio signal receiver as defined in claim 9, wherein said received state analyzing means detects variation in input field strength of the received FM broadcast signal and said parameter table memory means stores parameters for decreasing the output level of the received FM broadcast signal when the input field strength thereof is weak.

11. An FM audio signal receiver as defined in claim 10, wherein said digital signal processing means performs digital multiplication of the analog-to-digital converted signal in response to the read out proper parameter.

12. An FM audio signal receiver as defined in claim 10, wherein said parameter table memory means stores parameters for decreasing separation characteristic of the received FM broadcast signal when the input field strength thereof is weak.

13. An FM audio signal receiver as defined in claim 12, wherein said digital signal processing means performs digital addition of the analog-to-digital converted signal in response to the read out proper parameter.

14. An FM audio signal receiver as defined in claim 10, wherein said parameter table memory means stores parameters for attenuating a high frequency region of the received FM broadcast signal when the input field strength thereof is weak.

15. An FM audio signal receiver as defined in claim 14, wherein said digital signal processing means performs digital filtering of the analog-to-digital converted signal in response to the read out proper parameter.

16. An FM audio signal receiver as defined in claim 9, wherein said digital signal processing means performs a convolution operation in response to the read out proper parameter.

17. An FM audio signal receiver comprising:
receiving means for receiving an FM broadcast signal;
received state analyzing means for analyzing a state of an FM broadcast signal received by the receiving means, said received state analyzing means detecting input field strength of the received FM broadcast signal and a pulse noise;
analog-to-digital conversion means for analog-to-digital converting the FM broadcast signal received by the receiving means;
digital signal processing means for changing a characteristic of the analog-to-digital converted signal and performing, in response to detected values of the input field strength and the pulse noise, noise elimination processing for eliminating the pulse noise;
parameter table memory means for storing parameters for the digital signal processing means; and
control means for reading out from the parameter table memory means a proper parameter for realizing improvement of a characteristic of the analog-to-digital converted signal in response to a result of analysis by the received state analyzing means and for controlling the digital signal processing means with the read out proper parameter,
wherein said parameter table memory means stores parameters for decreasing an amount of correction of the noise elimination processing in accordance with input field strength of the received FM broadcast signal and with pulse width and amplitude of the pulse noise.

18. An FM audio signal received as defined in claim 17, wherein said digital signal processing means performs a convolution operation in response to the read out proper parameter.

19. An FM audio signal receiver as defined in claim 17, wherein said received state analyzing means detects variation in output amplitude of the received FM broadcast signal and said digital signal processing means performs, in response to a detected value of the variation, multipath noise elimination processing for eliminating a multipath noise.

20. An FM audio signal receiver as defined in claim 19, wherein said parameter table memory means stores parameters for changing a characteristic of the received FM broadcast signal in accordance with variation in the output amplitude of the received FM broadcast signal.

21. An FM audio signal receiver as defined in claim 20, wherein said digital signal processing means performs a convolution operation in response to the read out proper parameter.

* * * * *